3,051,574
FOAMING MALT BEVERAGES
Edward Segel, Chicago, Ill., assignor to J. E. Siebel Son's Company, Inc., Chicago, Ill., a corporation of Illinois
No Drawing. Filed Oct. 6, 1959, Ser. No. 844,639
4 Claims. (Cl. 99—48)

This invention relates to the improvement in appearance of carbonated alcoholic beverages derived from malt.

More specifically, it relates to the adhesion to glass of the foam of beverages such as beer, ale, and so-called "near beer," and to improvement in the appearance of a glass containing such a beverage after the head of foam has collapsed. In the present specification, the word "beer" is used to include the entire class of carbonated alcoholic malt beverages.

When a carbonated alcoholic malt beverage, as beer, is poured into a glass, a head of foam forms which gradually subsides. This head of foam has aesthetic appeal to the consumer. It is highly desirable that the foam be long-lived and attractive in appearance. The improvement of the appearance of a glass of beer by enhancement of foam stability is of sufficient commercial importance that considerable effort has been expended to find materials which, when added to beer, increase its foam stability.

However, foam stability is not the only factor which contributes to the aesthetic appeal of a glass of beer to the consumer. Among other important factors is the quality known as foam adhesion, or "cling." Foam adhesion, or cling, is the material deposited on the wall of the drinking glass as beer foam collapses. This deposit is generally in the form of a network which may vary from a scanty, almost non-existent irregular webbing to a uniform heavy lacework.

The existence of this network is characteristic of and almost exclusive to beer. Beers with scanty clings are viewed by those skilled in the art as being deficient in some constituent, while a beer which exhibits a dense, uniform lacework has great appeal and is considered satisfactorily balanced in its components.

Variation in cling is found not only among different brands of beer, but in different batches of beer made in the same brewery. One of the aims of a brewer is to produce consistently a beer which gives excellent cling. This goal is not easy to attain. Although a number of beer "foam stabilizers" are known, the problem of foam stabilization is entirely distinct from and not necessarily related to the problem of cling.

Detergents often have a harmful effect on cling, converting a beer with normal cling to a beer with little or no cling. Since traces of detergents may be introduced inadvertently into beer, either as a residue from cleaning procedures in the brewery, or by incomplete rinsing of glasses used by the consumer, a material which would inhibit this harmful effect of detergents is highly desirable.

An object of this invention is to improve cling in any carbonated malt beverage.

Another object is to enhance cling where this property is deficient in a beer.

Another object of this invention is to produce a beer more pleasing to the consumer, in that the residue left on the drinking glass after the head of foam has collapsed is more attractive in appearance.

Still another object is to produce a beer whose cling is resistant to the deleterious effect of detergents.

Other objects and advantages of this invention and the details thereof will appear hereinafter.

I have discovered that a heteropolysaccharide, Polysaccharide B–1459, produced by fermentation of glucose by the bacterium *Xanthomonas campestris* (most especially by the strain designated as NRRL B–1459, Northern Regional Research Laboratory classification), has a profoundly beneficial effect on the cling produced by beer. Information on Polysaccharide B–1459 can be obtained from the publication of the United States Department of Agriculture, Agricultural Research Service, Northern Utilization Research and Development Division, Peoria, Illinois. Bulletin No. CA–N–9, September 1959.

As described in Chemical and Engineering News, September 21, 1959, page 50, the aforementioned heteropolysaccharide can be produced by fermentation by the bacterial species *Xanthomonas campestris* of a medium containing glucose, organic nitrogen sources, dipotassium hydrogen phosphate, and appropriate trace elements. The culture is incubated for about four days under aerobic conditions. The crude product may then be isolated, for example, by centrifugation to remove cells, and precipitation with methanol.

As therein described, Polysaccharide B–1459 is essentially composed of mannose, glucose, potassium glucuronate, and acetyl in a molar ratio of approximately 2:1:1:1.

This heteropolysaccharide is a very light-colored powder, soluble in water. It is conveniently introduced into beer as an aqueous solution, either as the beer is transferred out of fermentation, in the cellar, or at any other convenient stage prior to packaging, in the brewing process.

The addition of Polysaccharide B–1459 in very small amounts markedly increases the cling of beer so treated. Comparison of identical glasses of beer, poured in the same manner, varying only in that one glass contains beer treated with Polysaccharide B–1459 whereas the other contains untreated beer, leaves no doubt as to the efficiency of the treatment. The treated beer's cling is more voluminous, more dense, and of a more regular and uniform network.

It is most surprising that a mere trace of Polysaccharide B–1459 has a beneficial effect on cling. Even at a concentration so low as 1 part per million, a useful effect can be noticed.

The extent of improvement of cling will depend in part on the concentration of Polysaccharide B–1459 in the beer, as well as to some extent on the particular beer used. One skilled in the art can readily select a concentration for a particular beer which will give an improvement of the magnitude desired.

For most purposes, the desired concentration of Polysaccharide B–1459 lies in the range of about 5–50 parts per million. As already mentioned, useful improvement is obtained at even lower concentrations. For special purposes, higher concentrations, such as up to about 160 p.p.m., may be desirable, though usually the effect on cling is sufficiently great that no advantage is obtained by the use of higher concentrations.

A further advantage of Polysaccharide B–1459 is that it inhibits the deleterious effect of common detergents on cling. Thus, while the cling of untreated beer is made markedly worse by such detergents as polyoxyethylene sorbitan monooleate ("Tween 80" manufactured by Atlas Powder Co.), a beer containing Polysaacharide B–1459 is not so affected.

Polysaccharide B–1459 has no effect on the foam life or foam stability of the beer. Its effect is specifically on cling.

The following examples illustrate the use of Polysaccharide B–1459 in carbonated alcoholic malt beverages, but in no way limit the invention. In these examples, clings are judged in quality as either poor, fair, fairly good, good, very good, or excellent.

Example I

An 0.67% aqueous solution of Polysaccharide B-1459 was added to finished beer A. The final concentration of Polysaccharide B-1459 was 80 p.p.m. The cling of the treated beer was "excellent." The cling of the same beer under identical conditions but without the addition of Polysaccharide B-1459 was "fairly good."

Example II

An 0.67% aqueous solution of Polysaccharide B-1459 was added to finished beer B. The final concentration of Polysaccharide B-1459 was 160 p.p.m. The cling of the treated beer was "good." The cling of the same beer under identical conditions but without the addition of Polysaccharide B-1459 was "fair."

Example III

An 0.067% aqueous solution of Polysaccharide B-1459 was added to finished beer C. The final concentration of Polysaccharide B-1459 was 1 p.p.m. The cling of the treated beer was "good." The cling of the same beer under identical conditions but without the addition of Polysaccharide B-1459 was "fairly good."

Example IV

An 0.067% aqueous solution of Polysaccharide B-1459 was added to prefiltration beer D. The concentration of Polysaccharide B-1459 in the beer was 8 p.p.m. The cling of the finished beer prepared from this prefiltration beer was "very good." The cling of finished beer prepared from prefiltration beer D to which no Polysaccharide B-1459 was added was "fair."

Example V

An 0.67% solution of Polysaccharide B-1459 was added to beer E. The final concentration of Polysaccharide B-1459 was 20 p.p.m. This beer also contained 3 p.p.m. of detergent ("Tween 80") known to destroy cling.

The cling of the beer treated with Polysaccharide B-1459 and Tween 80 was "fairly good." The cling of the same beer without Polysaccharide B-1459 but with 3 p.p.m. Tween 80 was "poor." The cling of the same beer without Polysaccharide B-1459 and without Tween 80 was "fairly good." It is thus evident that Polysaccharide B-1459 protects beer against the deleterious effect on cling of detergents.

I claim:

1. The method of improving the cling of carbonated alcoholic malt beverages which comprises dissolving therein Polysaccharide B-1459.

2. The method of improving the cling of carbonated alcoholic malt beverages, which comprises dissolving therein from about 1 to about 160 parts per million by weight of Polysaccharide B-1459.

3. A normally foam producing carbonated alcoholic malt beverage containing a cling-improving amount of Polysaccharide B-1459 dissolved therein.

4. Beer containing from about 1 to about 160 parts per million by weight of Polysaccharide B-1459.

References Cited in the file of this patent

"New Gum From Glucose," by R. F. Anderson, Chemical and Engineering News, Sept. 21, 1959, p. 50.

"Composition and Properties of a Heteropolysaccharide Produced From Glucose by *Xanthomonas campestris* NRRL B 1459," by A. Jeanes, J. E. Pittsley, J. H. Sloneker, and F. R. Senti, American Chemical Society, abstract of papers, 136th Meeting, 1959, p. 7D.

"Polysaccharide Production by *Xanthomonas campestris*," by R. R. Anderson, S. P. Rogovin, M. C. Cadmus, and R. W. Jackson, American Chemical Society, abstract of papers, 136th Meeting, 1959, page 7D.